(No Model.) 2 Sheets—Sheet 1.
T. E. ADAMS.
MOTOR CAR FOR ELECTRIC RAILWAYS.
No. 463,359. Patented Nov. 17, 1891.
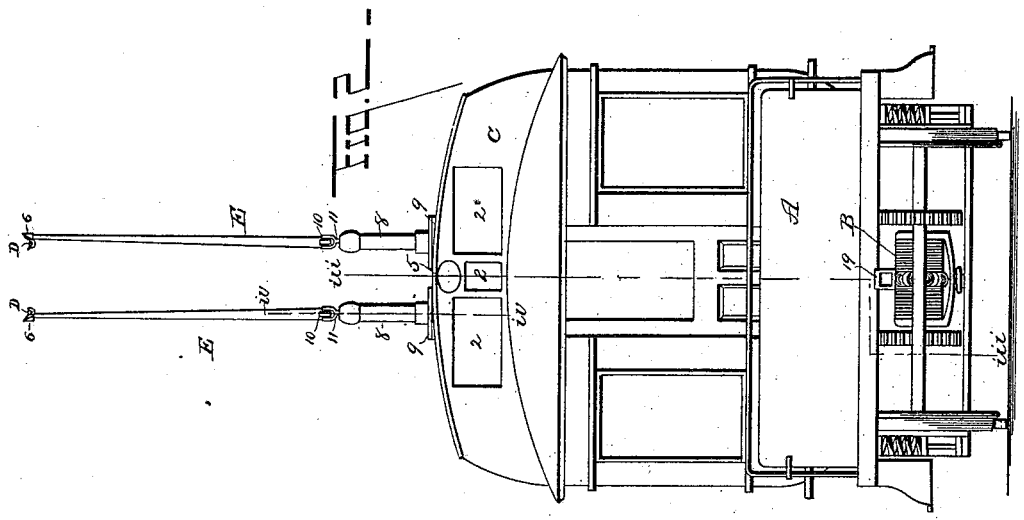
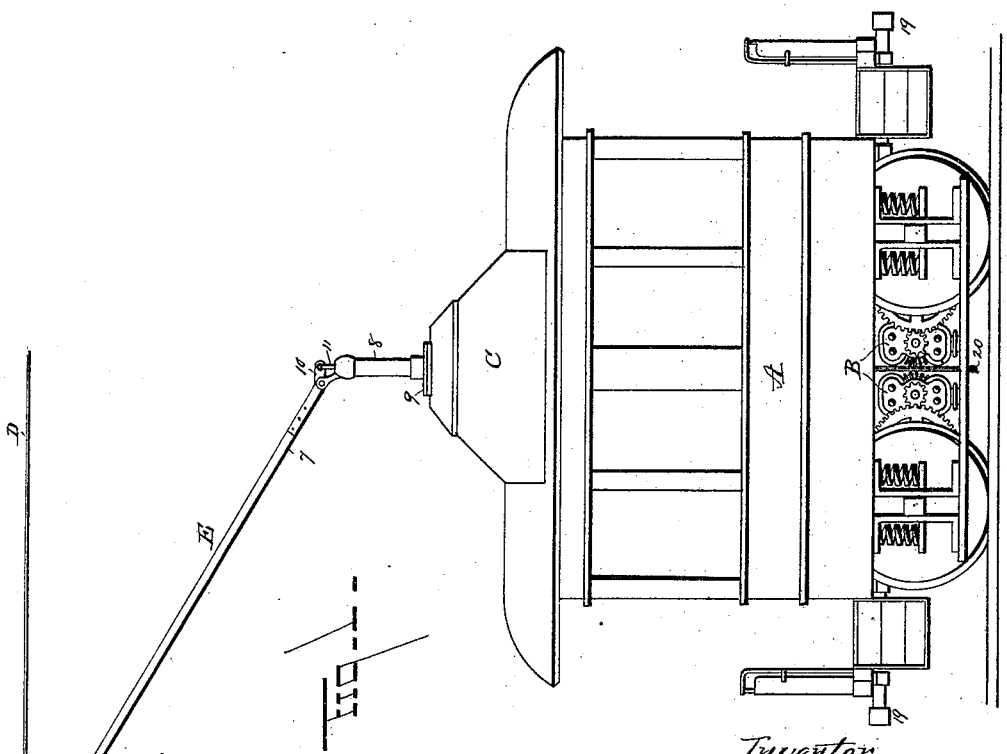
Witnesses
S. G. Nottingham
G. F. Downing
Inventor
Thomas E. Adams.
By his Attorney

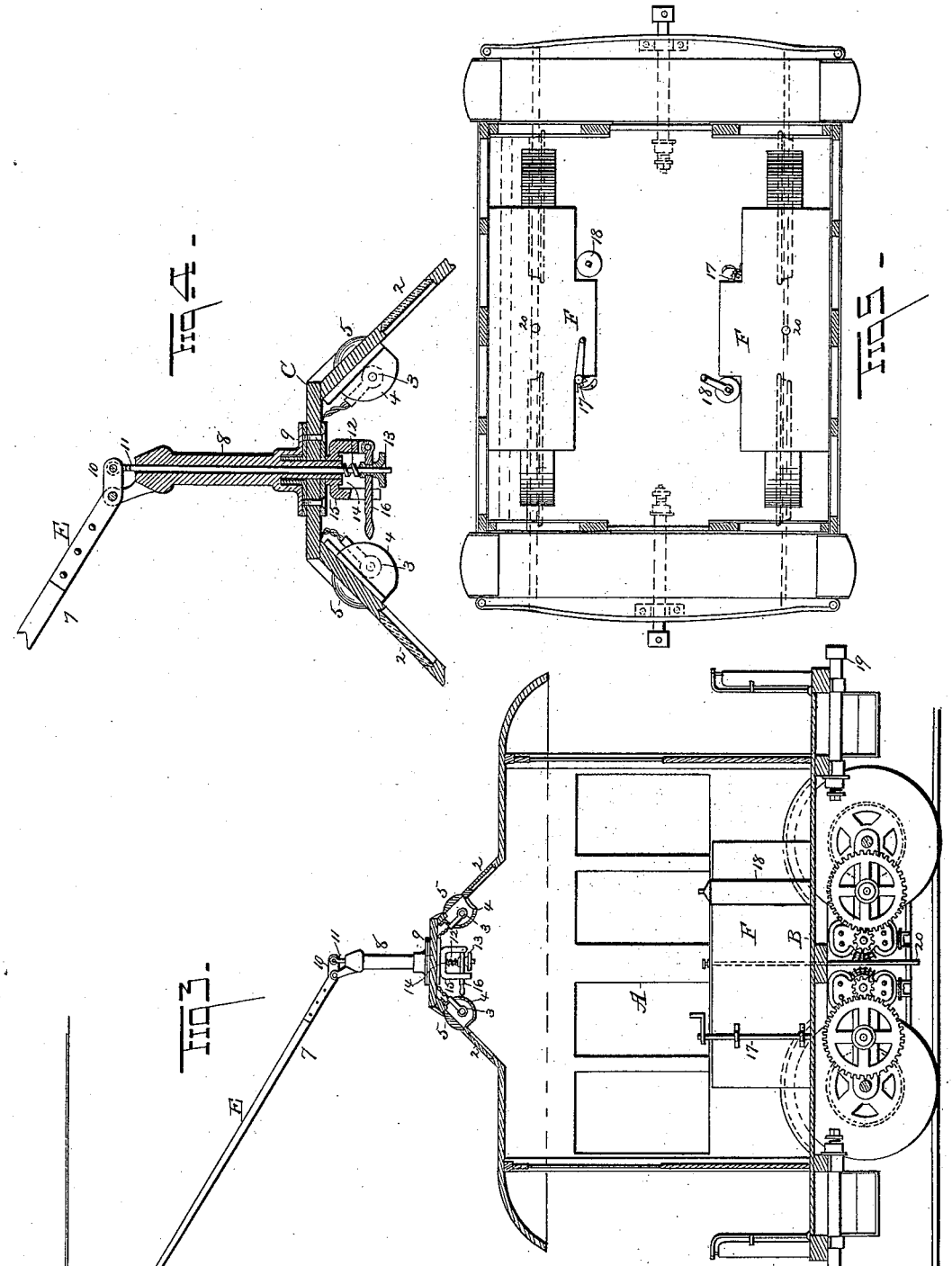

UNITED STATES PATENT OFFICE.

THOMAS E. ADAMS, OF CLEVELAND, OHIO, ASSIGNOR TO THE BRUSH ELECTRIC COMPANY.

MOTOR-CAR FOR ELECTRIC RAILWAYS.

SPECIFICATION forming part of Letters Patent No. 463,359, dated November 17, 1891.

Application filed May 28, 1890. Serial No. 353,411. (No model.)

*To all whom it may concern:*

Be it known that I, THOMAS EDGAR ADAMS, of Cleveland, in the county of Cuyahoga and State of Ohio, have invented certain new and useful Improvements in Motor-Cars for Electric Railways; and I do hereby declare the following to be a full, clear, and exact description of the invention, such as will enable others skilled in the art to which it appertains to make and use the same.

This invention relates more particularly to electrically-propelled vehicles or motor-cars for serving as locomotives in drawing other vehicles or cars on electrical railways employing overhead conductors for conveying the electricity to the said motor-cars, although the improvements constituting the same are severally included for all the uses to which they may respectively be applicable.

Heretofore in electric railways the trolleys and the electric line near the cars have been hid from the motor-drivers, who have therefore not been accustomed to observe the working of the trolleys or the condition of the line.

In accordance with the present invention glazed sight-openings are suitably placed in the roof of the car, so that the line near the car can be observed either in front of the car or where the trolley or trolleys travel along the line, which is usually behind the middle of the car, or both in front of the car and where the trolley or trolleys travel. Moreover, illuminating means or lamps with reflectors are arranged on the car for lighting up at night the line at the trolleys or in front of the car, or at both points. It is preferred to employ pole-trolleys provided with shifting or pressure-adjusting devices, or both, inside the car, in order that the trolley can be operated from within the car, and such a trolley or trolleys, in connection with sight-openings in the roof of the car with or without illuminating means on the car to enable the bearing of the trolley or trolleys on the line to be seen, constitutes a special feature of invention.

A new or improved trolley to be operated from within the car (to be hereinafter particularly described) also constitutes a special feature of invention; also, the application of duplicate trolleys operated from the inside of the car.

The sight-openings before referred to may be variously arranged; but the best arrangement (which itself constitutes a special feature of invention) is to place them in the inclined front and back of a dome-like elevation in the roof of the car above the motor-driver's position, so that without moving to any considerable extent he can look through said openings to inspect the line with its switches, frogs, and other devices as they pass, and to observe the working of the trolley or trolleys. The trolley or trolleys might be variously placed with reference to this dome-like elevation so long as it or they travel on the line in sight of the motor-driver; but the best mode is to mount one or (for a double-wire line) two spring-pressed swiveled and trailing-pole trolleys on the dome-like elevation. With this arrangement, no matter in which direction the car may run, the trailing trolley will be visible through one end of the dome-like elevation and the line in front of the car through the other end.

The dome-like elevation may be placed at different points on the car-roof; but it is preferable to place it at the middle of the car, which, as usual in electric railways, is adapted to move with either end in front, the car being made of short length that the motor-driver can observe the roadway in front of the car. Such car can be adapted for passengers; but it is designed to employ it to draw other cars or vehicles. To this end it is provided at the ends with couplers or coupler-buffers adapted to this service. Furthermore, to give a suitable weight to the car for traction, it is provided with sand-boxes of such size that they bear a considerable ratio to the weight of the car, and therefore act as ballast. From the sand-boxes pipes with valves lead to suitable points for delivering the sand on the rails to prevent slipping of the wheels.

In the accompanying drawings, which form part of this specification, Figure 1 is a side elevation of an electric-motor car constructed in accordance with the invention. Fig. 2 is an end view of the same. Fig. 3 is a longitudinal section on line *iii* of Fig. 2. Fig. 4 is a partial view on line iv of Fig. 2, and Fig. 5 is a horizontal section or a plan of the bottom of the car.

The car A carries electric motors B, geared to the car-axles for propelling the same. One or more motors may be used, of any suitable description, connected by any convenient means with one or both of the axles. As shown, there is a motor of the Brush type for each car-axle, connected therewith by a train of spur-gears.

In the roof of the car A is the dome-like elevation C, whose inclined ends are provided with glazed sight-openings 2, through which the overhead line D of conductors for supplying the electricity to the car can be observed near to and in front of the car, and also the trolleys E as they travel along the line. On the car are the lamps 3, provided with means for directing the rays on the line for illuminating it and the trolleys, said means, as shown, consisting of a reflector 4 and lens 5 for each lamp. An incandescent electric lamp is represented; but other forms may be used.

As shown, there are duplicate trolleys E, suitably insulated from each other and bearing each on its own line-wire. Each trolley, as shown, comprises a traveling-contact 6, mounted on a spring-pressed pole 7, which is hinged and swiveled to the car-roof, and each is adapted to be operated within the car. The trolley-poles are each hinged to an individual foot-piece 8, which is swiveled on the base-plate 9, fastened to the top of the car. Each trolley-pole constitutes a bent lever, being provided at its lower end with an obliquely-disposed lever-arm 10, which is connected by a joint with the forked upper end of a rod 11, which passes through an axial hole in the foot-piece 8 to the inside of the car, and is there provided with a spring 12, tending to draw the rod down and turn the pole 7 in the direction to press the contact 6 against the line-wire. The spring 12 is compressed between a nut 13 on the threaded lower end of the rod 11 and the end of the tubular projection 14 on the foot-piece 8, which passes through the roof of the car. By turning the nut 13 the force exerted by the spring, and consequently the pressure of the contact 6 against the wire, can be regulated. On the inside of the car is a turning-head 15, fixed on the tubular projection 14, so that by turning said head the foot-piece 8 and trolley-pole 7 can be revolved to change the position of the trolley on the wire. Before shifting the trolley the contact should be disengaged from the line-wire. This can be done by pressing up the rod 11 against the force of the spring 12. To facilitate the operation, a lever 16, fulcrumed on one side of the head 15 and working in a slot in the opposite side thereof, is loosely connected by a fork and annular groove connection with the nut 13, so as to move said nut up and down with the lever, but not to interfere with the rotation of the nut. When it is desired to shift the trolley, it is only necessary to raise the lever 16 and then to turn it around until the contact 6 is again under the line-wire, when the release of the lever will allow the spring 12 again to press and contact against the line-wire. By looking through the glazed sight-openings 2 during the operation it is easy to see that the trolley is in the right position and the contact bearing properly on the line-wire. The duplicate trolleys are or may be shifted independently and the pressure of either against the line will be appropriately adjusted.

With a single line-wire one trolley only need be used.

The trolleys are shown as mounted on the dome-like elevation C, which is in the middle of the car over the motor-driver's position. The means for handling the car—such as the rheostats and switch for the electric motors and the brake for the wheels of the car—are appropriately placed for operation by the motor-driver under the dome-like elevation. By way of illustration, upright shafts such as are used at the ends of electric cars for applying the brake-shoes to the wheels are represented at 17; and rotary switch and rheostatic apparatus such as now used at the ends of electric cars are represented at 18; but of course other dispositions may be made. The handles, it is preferred, should be removable, so that they can be shifted from one brake-shaft or switch-shaft to the other when the motion of the car is reversed.

The mechanical connections between the brake-shaft and brake-shoes are not represented. They form no part of the invention and may be of any suitable description. The electrical connections are also not illustrated. They may be of any ordinary or suitable description. The devices to be touched by the motor driver or conductor in shifting the trolleys or adjusting their pressure against the line-wires should be of insulating material or be appropriately insulated from the conductors on the car.

At the ends the car is provided with couplers or coupler-buffers 19, adapted to draw other cars. To increase the traction-power large ballasting sand-boxes F are placed in the car, (as shown, one on each side of the motor-driver's position,) and they are each provided with a pipe 20, leading therefrom to a point just above the rail, and a valve 21 in said pipe for admitting or cutting off the flow of sand onto the rail.

Having fully described my invention, what I claim as new, and desire to secure by Letters Patent, is—

1. An electrically-propelled car provided with a trolley or trolleys for an overhead electric line and with glazed sight-openings in the roof of the car for observing the line, substantially as described.

2. In combination with an overhead electric line, an electrically-propelled car provided with a trolley or trolleys for such line and with glazed sight-openings in the roof of the car, through which the line near the car in front of the car is visible, substantially as described.

3. In combination with an overhead electric line, an electrically-propelled car provided with a trolley or trolleys for such line, and also with glazed sight-openings in the roof, through which the points where the trolleys travel on said line are visible, substantially as described.

4. An electrically-propelled car provided with a trolley or trolleys for an overhead electric line, also with glazed sight-openings in the roof of the car for observing the line near the car, and with lamps on the car for illuminating the line near the car, substantially as described.

5. An electrically-propelled car provided with a pole trolley or trolleys operated from within the car, also with sight-openings in the roof of the car, through which the trolleys are visible to the person operating the same within the car, substantially as described.

6. The combination, with an electrically-propelled vehicle, of a revoluble foot-piece located thereon, a trolley-pole pivotally connected to said foot-piece, a contact carried by said pole, an arm projecting at an angle from the pole, a rod pivotally connected to the free end of said arm and passing loosely through said foot-piece, and means within the car connected with the foot-piece and said rod, whereby to manipulate the trolley-pole relatively to the line-wire and to the car, substantially as set forth.

7. An electrically-propelled vehicle provided with a trolley or trolleys for an overhead line, and also with a dome-like elevation in the roof, through the wall of which the line is visible near the car, and a trolley mounted on the said elevation whose traveling contact is also visible through said wall, substantially as described.

8. An electrically-propelled vehicle provided with a dome-like elevation in the roof, through the wall of which the line is visible near the car, and a trolley mounted on said elevation whose traveling contact is also visible through said wall, substantially as described.

9. An electrically-propelled vehicle provided with a dome-like elevation in the roof, through the wall of which the line is visible near the car in both directions, and provided also with a trailing-pole trolley or trolleys mounted in a swivel on said elevation, substantially as described.

10. An electrically-propelled vehicle provided with a dome-like elevation in the roof, through the wall of which the line near the car is visible in both directions, and also with a trailing-pole trolley or trolleys mounted in a swivel on said elevation and provided with means for shifting the same from within the car, substantially as described.

11. An electrically-propelled vehicle provided with a trolley or trolleys for an overhead electric line, and also with glazed openings, through which the line near the car is visible, the said vehicle having the motor-driver's position in the line or lines of vision, substantially as described.

12. An electrically-propelled vehicle or motor-car provided with a dome-like elevation in the roof at the middle of the car, through the wall of which elevation the overhead line near the car is visible, and provided also with a trailing swiveled trolley or trolleys mounted on said elevation, the said vehicle or car having the motor-driver's position in the middle of the car under said dome-like elevation, and a coupler at each end, whereby it is adapted to draw other cars, substantially as described.

In testimony whereof I have signed this specification in the presence of two subscribing witnesses.

THOMAS E. ADAMS.

Witnesses:
A. B. CALHOUN,
C. J. LEEPHART.